United States Patent
Shimizu et al.

(10) Patent No.: US 7,056,606 B2
(45) Date of Patent: Jun. 6, 2006

(54) MAGNETIC RECORDING MEDIUM, METHOD MANUFACTURE THEREFOR, AND APPARATUS FOR MAGNETIC REPRODUCING AND REPRODUCING RECORDINGS

(75) Inventors: Kenji Shimizu, Ichihara (JP); Akira Sakawaki, Ichihara (JP); Hiroshi Sakai, Ichihara (JP); Takashi Hikosaka, Tokyo (JP); Soichi Oikawa, Kawasaki (JP)

(73) Assignees: Showa Denko K.K., Tokyo (JP); Kabushiki Kaisha Toshiba, Tokyo (JP)

( * ) Notice: Subject to any disclaimer, the term of this patent is extended or adjusted under 35 U.S.C. 154(b) by 41 days.

(21) Appl. No.: 10/781,906

(22) Filed: Feb. 20, 2004

(65) Prior Publication Data

US 2004/0191576 A1 Sep. 30, 2004

Related U.S. Application Data

(63) Continuation-in-part of application No. 10/082,201, filed on Feb. 26, 2002, now Pat. No. 6,699,600.

(60) Provisional application No. 60/275,102, filed on Mar. 13, 2001.

(30) Foreign Application Priority Data

Feb. 28, 2001 (JP) .......................... P2001-055950

(51) Int. Cl.
*G11B 5/65* (2006.01)

(52) U.S. Cl. ................. 428/832.1; 428/836.3

(58) Field of Classification Search ............... 428/611, 428/65.3, 694 R, 694 T, 694 TS, 694 B, 428/900, 832.1, 836.1, 828, 836.3; 369/283, 369/288

See application file for complete search history.

(56) References Cited

U.S. PATENT DOCUMENTS

| | | | |
|---|---|---|---|
| 4,722,869 A | 2/1988 | Honda et al. | |
| 5,679,473 A | 10/1997 | Murayama et al. | |
| 5,815,343 A | 9/1998 | Ishikawa et al. | |
| 6,174,597 B1 * | 1/2001 | Yusu et al. | 428/694 B |
| 6,562,489 B1 * | 5/2003 | Abarra et al. | 428/694 TS |
| 6,602,620 B1 * | 8/2003 | Kikitsu et al. | 428/694 T |
| 6,627,301 B1 * | 9/2003 | Shimizu et al. | 428/900 |
| 2002/0012816 A1 | 1/2002 | Shimizu et al. | |
| 2004/0053073 A1 * | 3/2004 | Lu et al. | 428/694 T |

FOREIGN PATENT DOCUMENTS

JP 2002-025030 1/2002

OTHER PUBLICATIONS

Translation JA 2002-025030.*

* cited by examiner

*Primary Examiner*—Stevan A. Resan
*Assistant Examiner*—Louis Falasco
(74) *Attorney, Agent, or Firm*—Sughrue Mion, PLLC (57) ABSTRACT

A magnetic recording medium comprising: on a non-magnetic substrate, at least a soft magnetic undercoat film comprising a soft magnetic material; an orientation control film for controlling an orientation of a film directly above; a perpendicular magnetic film in which an axis of easy magnetization is oriented mainly perpendicularly with respect to the substrate; and a protection film, wherein the perpendicular magnetic film has a structure in which a large number of magnetic grains are separated by a grain boundary layer, and an average separating distance between the magnetic grains along a straight line which connects centers of gravity of mutually neighboring magnetic grains is 1 nm or greater.

4 Claims, 3 Drawing Sheets

MAGNETIC RECORDING MEDIUM, METHOD MANUFACTURE THEREFOR, AND APPARATUS FOR MAGNETIC REPRODUCING AND REPRODUCING RECORDINGS

This application is a continuation-in-part application of U.S. patent application Ser. No. 10/082,201 filed on Feb. 26, 2002, now U.S. Pat. No. 6,699,600, which claims benefit of Provisional U.S. Patent Application No. 60/275,102 filed on Mar. 13, 2001, and claims priority of Japanese Patent Application No. 2001-055950 filed on Feb. 28, 2001, the contents of all of which are incorporated herein by reference.

BACKGROUND OF THE INVENTION

1. Field of the Invention

This invention relates to a magnetic recording medium, a method of manufacture therefor, and for an apparatus for magnetic recording and reproducing using this magnetic recording medium.

2. Description of the Related Art

So-called perpendicular magnetic recording media, in which the axis of easy magnetization within the magnetic film is arranged generally perpendicularly, have received a great deal of attention because the effect of the demagnetizing field at the bit boundaries is small even when high recording density has been realized, it is possible to achieve noise reduction due to the formation of magnetic recording domains which have distinct boundaries, and moreover, for having strong thermal fluctuation effects because it is possible to realize high recording density even if the comparative bit volume is large.

For example, in Japanese Patent Application, First Publication No. Hei 7-44852, a magnetic recording medium having a perpendicular magnetic film comprising a CoCrPtTa alloy and soft magnetic backlayer is disclosed.

In Japanese Patent Application, First Publication No. Hei 5-334644, a magnetic recording medium having a perpendicular magnetic film comprising an alloy in which V has been added to a CoCrTa alloy is disclosed.

In Japanese Patent Application, First Publication No. Hei 5-343225, a magnetic recording medium having a perpendicular magnetic film comprising an alloy in which B has been added to a CoCrTa alloy is disclosed.

In Japanese Patent Application, First Publication No. Hei 11-296833, a magnetic recording medium having a perpendicular magnetic film having a two-layered structure is disclosed.

For perpendicular magnetic recording media, in order to obtain magnetic characteristics such as coercive force and squareness ratio, it is important to increase the perpendicular orientation in the perpendicular magnetic film.

However, with conventional magnetic recording media, when the orientation of the perpendicular magnetic film becomes better, since the direction of the growth of the crystals becomes uniform, the distance between the magnetic grains becomes smaller, and noise due to the effect of the exchange coupling increases.

SUMMARY OF THE INVENTION

In consideration of the above circumstances, an object of the present invention is to provide a magnetic recording medium with which it is possible to obtain improved noise characteristics, a manufacturing method therefor, and a apparatus for magnetic recording and reproducing.

The magnetic recording medium of the present invention comprises on a non-magnetic substrate at least a soft magnetic undercoat film comprising a soft magnetic material, an orientation control film for controlling the orientation of the film directly above, a perpendicular magnetic film in which the axis of easy magnetization is oriented mainly perpendicularly with respect to the substrate, and a protection film. The perpendicular magnetic film has a structure in which a large number of magnetic grains are separated by a grain boundary layer, and the average separating distance between these magnetic grains along a straight line which connects the centers of gravity of neighboring magnetic grains is 1 nm or greater.

The average grain diameter is preferably 4 to 12 nm.

It is preferable for the magnetic recording medium of the present invention to have a nucleation field ($-H_n$) of 0 (Oe) or greater as measured using a vibrating sample magnetometer.

In the units of magnetic field strength, there is the conversion relationship of:

$$4\pi \times 10^{-3} \text{ (Oe)} = 1 \text{(A/m)}$$

The nucleation field is preferably a value measured at 70° C.

It is preferable for the perpendicular magnetic film to comprise a CoCrPtX type alloy (where X is one or more of Mo, B, V, W, Zr, Re, Cu, Ru, Hf, Ir, and Y), and for the amount of X contained to be 0.5 to 15 at %.

In the present invention, it is possible to adopt a constitution in which X is B and the amount of X contained is 10 at % or less.

The perpendicular magnetic film may comprise Cr in an amount of 12 to 26 at %, Pt in an amount of 10 to 24 at %, X in an amount of 0.5 to 15 at %, and the remainder as Co.

The perpendicular magnetic film preferably comprises Co and Cr, and when the Cr concentration in the magnetic grains is c1, and the Cr concentration in the grain boundary layer is c2, c2/c1 is 1.4 or greater.

The Cr concentration in the grain boundary layer is preferably 15 at % or greater.

The perpendicular magnetic film may have a granular structure.

A structure may be adopted in which a non-magnetic intermediate film is provided between the orientation control film and the perpendicular magnetic film, and the non-magnetic intermediate film comprises a CoCrPtX1 type alloy (X1 being at least one of Mo, Ta, B, V, W, Zr, Re, Cu, Ru, Hf, Ir, and Y), the content of Cr being 20 to 45 at %, the content of Pt being 5 to 25 at %, the content of X1 being 0.5 to 20 at %, and the remainder being Co.

It is preferable that the content of Cr is 30 to 45 at %.

The non-magnetic intermediate film preferably comprises Co and Cr, has a structure in which crystal grains having a high Cr content are separated by a grain boundary layer having a low Cr content, and the average separating distance between the crystal grains along straight lines which connect the centers of gravity of mutually neighboring crystal grains is 1 nm or greater.

The average grain diameter of the crystal grains is preferably 4 to 12 nm.

The manufacturing method for a magnetic recording medium of the present invention is a manufacturing method for a magnetic recording medium having on a non-magnetic substrate, at least a soft magnetic undercoat film comprising a soft magnetic material, an orientation control film for controlling an orientation of a film directly above, a perpendicular magnetic film in which the axis of easy magnetization is oriented mainly perpendicularly with respect to the substrate, and a protection film, wherein the perpendicular magnetic film has a structure in which a large number of magnetic grains are separated by a grain boundary layer, and the average separating distance between the magnetic grains along a straight line which connects centers of gravity of mutually neighboring magnetic grains is 1 nm or greater.

The apparatus for magnetic recording and reproducing of the present invention comprises a magnetic recording medium, and a magnetic head for recording and reproducing information on the magnetic recording medium, wherein the magnetic recording medium comprises on a non-magnetic substrate, at least a soft magnetic undercoat film comprising a soft magnetic material, an orientation control film for controlling an orientation of a film directly above, a perpendicular magnetic film in which an axis of easy magnetization is oriented mainly perpendicularly with respect to the substrate, and a protection film, and wherein the perpendicular magnetic film has a structure in which a large number of magnetic grains are separated by a grain boundary layer, and the average separating distance between the magnetic grains along a straight line which connects centers of gravity of mutually neighboring magnetic grains is 1 nm or greater.

DESCRIPTION OF THE EMBODIMENTS

Figure 1:
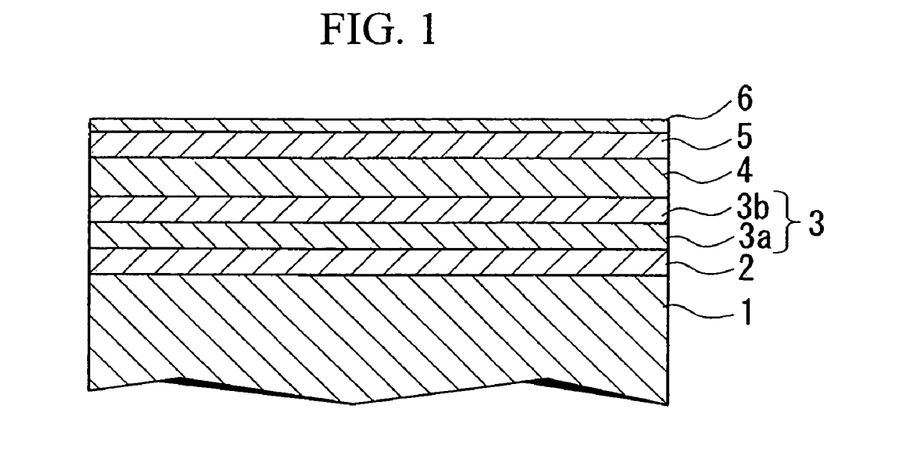
FIG. 1 is a partial cross-section showing a first embodiment of the magnetic recording medium of the present invention.

FIG. 1 shows a first embodiment of the magnetic recording medium of the present invention. The magnetic recording medium shown here has a structure in which a soft magnetic undercoat film 2, an orientation control film 3, a perpendicular magnetic film 4, a protection film 5, and a lubrication film 6 have been formed successively on a non-magnetic substrate 1.

As the non-magnetic substrate 1, metal substrates comprising a metal material such as aluminum, and aluminum alloy can be mentioned, and non-metal substrates comprising non-metal materials such as glass, ceramic, silicon, silicon carbide, and carbon can also be mentioned.

As glass substrates, there are amorphous glass and crystallized glass, and as amorphous glass commonly used soda lime glass, and aluminosilicate glass can be mentioned. In addition, as crystallized glass, it is possible to use lithium type crystallized glass. As ceramic substrates, sintered compacts having commonly used aluminum oxide, aluminum nitride, silicon nitride, and the like as main components, and fiber reinforced products thereof can be mentioned.

As the non-magnetic substrate 1, it is possible to use one of the above-mentioned metal substrates or non-metal substrates on whose surface a NiP film has been formed using a plating method, a sputtering method, or the like.

The mean surface roughness Ra of the substrate 1 is preferably 0.01 to 2 nm (and more preferably 0.05 to 1.5 nm). When the mean surface roughness Ra is less than 0.01 nm, vibration in the magnetic head occurs readily, and when it exceeds 2 nm, it is easy for the glide characteristic to become unsatisfactory.

The soft magnetic undercoat film 2 is provided to increase the perpendicular direction component of the magnetic flux output from the magnetic head, and to fix the magnetization of the perpendicular magnetic film 4, in which data is recorded, more strongly in a direction perpendicular the substrate 1.

As the material for the soft magnetic undercoat film 2, it is preferable to use a Co alloy having an amorphous structure and containing 80 at % or greater of Co, and containing 2 at % or greater of at least one element selected from among Zr, Ta, Nb, and Y.

As this material, CoZr, CoZrNb, CoZrTa, CoZrCr, and CoNbY type alloys or the like can be mentioned as suitable examples.

In addition, as the material for the soft magnetic undercoat film 2, it is possible to use a Fe alloy containing 60 at % or greater of Fe, and containing 2 at % or greater of at least one element selected from among Ta, Zr, Al, Si, and Hf, and having a saturation magnetic flux density Bs(T) of 0.8 (T) or greater.

As this material, FeAlSi, FeTaC, FeAlSiRuTi, FeHfO, FeTaN, and FeZrO type alloys and the like can be mentioned as being suitable.

In addition, as the material for the soft magnetic undercoat film 2, it is possible to use a Fe alloy containing 60 at % or greater of Fe, and containing 2 at % or greater of at least one element selected from among O, N, B, and C, and having a saturation magnetic flux density Bs(T) of 0.8 (T) or greater.

As this material, materials having a granular structure in which fine crystal grains are dispersed within a matrix, or having a fine crystalline structure such as FeN, FeTaC, FeHfO, FeTaN, FeAlO, FeB, and FeZrN type alloys can be mentioned as being preferable.

The product Bs·t of the saturation magnetic flux density Bs of the soft magnetic undercoat film 2 and the thickness t of the soft magnetic undercoat film 2 is preferably 40T·nm or greater (and more preferably 60T·nm or greater). When Bs·t is less than the above-mentioned range, the reproduction waveform becomes such that it is distorted, and therefore, this is not desirable.

The coercive force Hc of the soft magnetic undercoat film 2 is preferably made to be 200 (Oe) or less (and more preferably 50(Oe) or less).

When the coercive force Hc exceeds this range, the soft magnetic characteristic is not satisfactory, and the reproduction waveform becomes a waveform having distortion from so-called square waves.

In addition, the maximum magnetic permeability of the soft magnetic undercoat film 2 is preferably 100 to 1,000,000 (and more preferably 1,000 to 500,000).

When the maximum magnetic permeability is less than the above-mentioned range, writing to the magnetic recording medium during recording is unsatisfactory, and it is not possible to obtain satisfactory recording and reproducing characteristics. Magnetic permeability is a value expressed using CGS units.

Since the surface morphology of the soft magnetic undercoat film 2 influences the surface morphology of the perpendicular magnetic film 4 and the protection film 5, in order for the surface inequality of the magnetic recording medium to be small, and the flying height of the magnetic head to be reduced, it is preferable for the average surface roughness Ra of the soft magnetic undercoat film 2 to be 2 nm or less.

The orientation control film 3 controls the orientation and crystal grain diameter of the perpendicular magnetic film 4 provided directly above the orientation control film 3. This orientation control film 3 preferably has a two-layered structure comprising a first orientation control layer 3a and a second orientation control layer 3b.

As the material for the first orientation control layer 3a, a material having as a main component one or more alloys from among NiAl, FeAl, CoFe, CoZr, NiTi, AlCo, AlRu, and CoTi can be used. In addition, it is possible to use a material in which elements such as Cr, Nb, V, W, Mo, B, O N, Ru, and Nd have been added to these alloys.

When the above-mentioned two-element alloys (NiAl, FeAl, CoFe, CoZr, NiTi, AlCo, AlRu, and CoTi) are used, the proportion of the two components which make up the alloys is preferably 40 to 60 at % (and more preferably 45 to 55 at %) for all cases.

A thickness for the first orientation control layer 3a of 0.1 to 50 nm (and preferably 1.5 to 30 nm) is suitable.

When this thickness is less than the above-mentioned range, the perpendicular orientation within the perpendicular magnetic film 4 is degraded, and the noise characteristics and thermal fluctuation resistance (or thermal stability) become inferior.

In addition, when this thickness exceeds the above-mentioned range, the perpendicular orientation within the perpendicular magnetic film 4 is degraded, and the noise characteristics and thermal stability become inferior.

The thermal stability means the difficulty with which output degradation due to thermal fluctuation (or thermal decay) occurs. The first orientation control layer 3a preferably has a bcc structure.

The second orientation control layer 3b preferably comprises a material having as a main component one or two or more from among Ti, Zn, Y, Zr, Ru, Re, Gd, Tb, and Hf.

A thickness for the second orientation control layer 3b of 0.1 to 50 nm (and preferably 2 to 25 nm) is suitable.

When this thickness is less than the above-mentioned range, the perpendicular orientation within the perpendicular magnetic film 4 is degraded, and the recording and reproducing characteristics and the thermal stability become inferior. When this thickness exceeds the above-mentioned range, the crystal grains in the second orientation control layer 3b become coarse, the magnetic grains in the perpendicular magnetic film 4 become coarse, and the recording and reproducing characteristics are degraded. In addition, the distance between the magnetic head and the soft magnetic undercoat film 2 during recording and reproducing becomes greater, and the resolution of reproduction signals becomes degraded, therefore, this is not desirable.

The second orientation control layer 3b preferably has an hcp structure.

In this embodiment, the orientation control film 3 comprises a first orientation control layer 3a and a second orientation control layer 3b. However, the orientation control film 3 may have a single layer structure comprising first orientation control layer 3a or second orientation control layer 3b.

The perpendicular magnetic film 4 is a magnetic film in which the axis of easy magnetization is oriented generally perpendicularly with respect to the substrate.

As the material for the perpendicular magnetic film 4, CoCr, CoCrPt, CoCrTa, and the like can be mentioned.

Of these, in particular, it is preferable to use a magnetic material comprising a CoCrPtX type alloy (where X is one or more of Mo, B, V, W, Zr, Re, Cu, Ru, Hf, Ir, and Y). An amount of X of 0.5 to 15 at % is suitable (and 2 to 10 at % is preferable).

When the amount of X contained is less than this range, the separating distance between the magnetic grains 7 becomes smaller and this may lead to an increase in noise. When the above-mentioned range is exceeded, the coercive force is degraded.

From the point of view of noise characteristics, it is preferable for the above-mentioned X to be B. In particular, when the amount of B contained is 10 at % or less, superior noise characteristics are obtained.

In the material of the perpendicular magnetic film 4, it is preferable to use a CoCrPtX type alloy comprising Cr in an amount of 12 to 26 at %, Pt in an amount of 10 to 24 at %, X in an amount of 0.5 to 15 at %, and the remainder as Co.

In the perpendicular magnetic film 4, it is possible to use a material in which a non-magnetic metal such as Ag, Ti, Ru, and C, or compounds thereof is added as a magnetic grain separating material to a magnetic material such as CoCr, CoCrPt, CoCrTa, CoCrPtX type alloys (wherein the amount of X is preferably 0.5 to 15 at % (and more preferably 2 to 10 at %)).

In addition, as the magnetic grain separating material, oxides, nitrides, fluorides, and carbides can be used. More specifically, $SiO_2$, SiO, $Si_3N_4$, $Al_2O_3$, AlN, TiO, $TiO_2$, TiN, BN, $CaF_2$, TiC, and the like can be mentioned as examples.

Depending on the composition, if the perpendicular magnetic film 4 contains Ta, the coercive force is degraded, therefore, a constitution which does not contain Ta is also possible.

Figure 2:
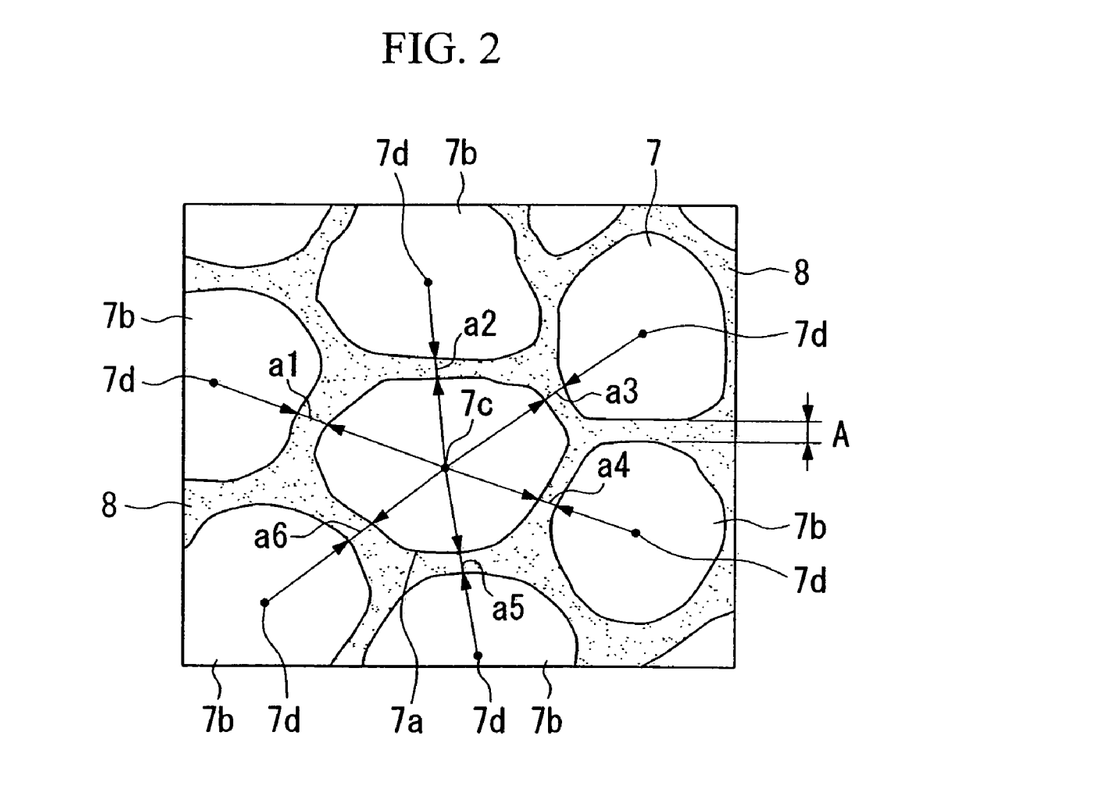
FIG. 2 is a diagram showing the crystal structure of the magnetic recording medium shown in FIG. 1.

As shown in FIG. 2, the perpendicular magnetic film 4 has a constitution in which large numbers of magnetic grains 7 are separated by means of a grain boundary layer 8.

The magnetic grains 7 comprise the material shown as the material for the perpendicular magnetic film 4, for example, a CoCrPtX type alloy. The Cr concentration c1 within the magnetic grains can be for example 8 to 15 at %.

The average grain diameter of the magnetic particles 7 is preferably 4 to 12 nm.

When the average grain diameter is less than the above-mentioned range, the influence of the magnetic after-effect is too large, and when it exceeds the above-mentioned range, the noise characteristics are degraded, therefore, this is not desirable.

The average grain size can be calculated in the following way. A circle having a surface area identical to that of the magnetic grains 7 is assumed, and the diameter of that circle is taken as the diameter of the magnetic grains 7.

The diameter for a plurality of magnetic grains 7 is calculated by the same procedure, the average of the diameters of this plurality of magnetic grains 7 is calculated and taken as the average grain diameter.

In calculating the average grain diameter, the number of magnetic grains 7 which form the subject of the grain measurement is suitably 100 or greater (and preferably 500 or greater). When the number of magnetic grains which form the subject of the measurement is below the above-mentioned range, the reliability of the data is degraded.

The grain boundary layer 8 comprises constituent elements identical to those of the above-mentioned magnetic grains 7, for example CoCrPtX type alloys. However, the composition thereof is different from that of the magnetic grains 7. The grain boundary layer 8 preferably has a constitution in which the Cr concentration $c_2$ is higher than the Cr concentration $c_1$ in the magnetic grains 7.

The Cr concentration $c_2$ in the above-mentioned grain boundary layer 8 is preferably 15 at % or greater.

When the Cr concentration $c_2$ is less than 15 at %, the exchange interaction between the magnetic grains 7 themselves increases, and this invites degradation of the noise characteristics.

The ratio of the Cr concentration $c_2$ in the grain boundary layer 8 with respect to the Cr concentration $c_1$ in the magnetic grains 7, in other words $c_2/c_1$, is preferably a value of 1.4 or greater, and more preferably a value of 1.4 to 3.0.

When this ratio is less than 1.4, the relative concentration of the magnetic elements in the grain boundary layer 8 is increased, and grain boundary layer 8 easily becomes magnetized, the exchange interaction between the magnetic grains 7 themselves increases, and this invites degradation of the noise characteristics.

In the magnetic recording medium of the present embodiment, the average separating distance of the magnetic grains 7, in other words, the average separating distance A shown in FIG. 2, is 1 nm or greater (and preferably 1.5 nm or greater).

When the separating distance A is less than 1 nm, the exchange interaction between the magnetic grains 7 increases and there is concern that this will invite degradation in the noise characteristics.

It is preferable for this separating distance A to be ½ or less of the average grain diameter of the magnetic grains 7. When this separating distance A exceeds this range, the magnetization per volume decreases, and the coercive force is degraded.

In the following, the procedure for calculating the average separating distance A between magnetic grains 7 based on a photograph (taken by TEM or the like) showing the crystal structure in the vicinity of the surface of perpendicular magnetic film 4 will be explained with reference to FIG. 2.

(1) Of the magnetic grains 7, the center of gravity is calculated for a specified magnetic grain (the specified magnetic grain indicated by reference 7a) and for neighboring magnetic grains 7b which neighbor the specified magnetic grain 7a.

(2) The center of gravity 7c of the specified magnetic grain 7a, and the centers of gravity 7d of the neighboring magnetic grains 7b are connected by drawing straight lines, and the separating distances a1 to a6 between the specified magnetic grain 7a and the neighboring magnetic grains 7b along these straight lines are measured.

(3) The average value for the separating distances a1 to a6 of the straight lines between these centers of gravity is calculated.

(4) Average values for the separating distances are calculated using procedure (1) to (3) for a plurality of magnetic grains 7, these average values for the separating distances of these plurality of magnetic grains 7 (specified magnetic grains 7a) are further averaged, and the above-mentioned average separating distance A is obtained.

In procedure (4), the number of magnetic grains 7 which form the subject of the separating distance measurement is suitably 100 or more (and preferably 500 or more). When the number of subject magnetic grains is less than the above-mentioned range, the reliability of the data is reduced.

In the above explanation, "magnetic grains 7b which neighbor magnetic grains 7a" refers to a situation in which no other grains are present along the straight lines connecting the center of gravity 7c of magnetic grain 7a and the center of gravity 7d of magnetic grain 7b. In other words, grains which have positional relationships in which other grains are not present along the straight lines connecting their centers of gravity are considered to be neighboring.

The thickness of the perpendicular magnetic film 4 is suitably 3 to 100 nm (and preferably 5 to 50 nm). When the thickness of the perpendicular magnetic film 4 is less than the above-mentioned range, it is not possible to obtain sufficient magnetic flux, and reproduction output is degraded. In addition, when the thickness of perpendicular magnetic film 4 exceeds the above-mentioned range, the magnetic grains within the perpendicular magnetic film 4 become coarse, and the recording and reproducing characteristics are degraded, and this is not preferable.

The coercive force of the perpendicular magnetic layer 4 is preferably made to be 3000 (Oe) or greater. When the coercive force is less than 3000 (Oe), high-density recording is difficult, and thermal stability becomes inferior, therefore, this is not preferable.

It is preferable for the magnetic recording medium to have a nucleation field (-Hn) of 0 (Oe) or greater (and more preferably 500 (Oe) or greater).

When the nucleation field (-Hn) is less than this range, thermal stability is degraded.

In the measurement of the nucleation field (-Hn), in order to exclude the influence of the soft magnetic undercoat film 2, it is preferable to use a disc comprising only a substrate 1, an orientation control film 3, a perpendicular magnetic film 4, and a protection film 5, and to carry out the measurement on this disc using a vibrating sample magnetometer. In addition, it is possible to carry out the measurement of the nucleation field on the magnetic recording medium as it is.

Figure 3:
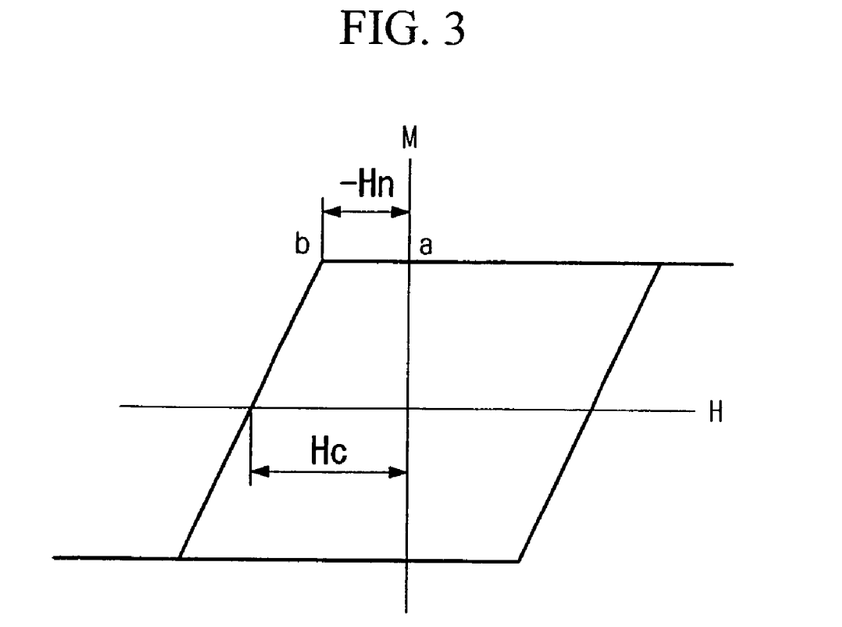
FIG. 3 is a hysteresis curve for the magnetic recording medium shown in FIG. 1.

As shown in FIG. 3, the nucleation field (-Hn) expresses the distance (Oe) from point a at which the external magnetic field is 0, to a point b at which magnetic reversal occurs in a process in which the external magnetic field is reduced from a condition of saturated magnetism, in a hysteresis curve (MH curve).

It is preferable for the nucleation field (-Hn) to fall within the above-mentioned range when measured under conditions of 70° C. This is because the temperature to which the magnetic recording medium is exposed under normal use conditions when the magnetic recording medium is used in a magnetic recording and reproducing apparatus is 70° C. or less. Therefore, if the nucleation field (-Hn) is within the above-mentioned ranged under conditions of 70° C., it can be considered to display sufficient thermal stability.

As shown in FIG. 3, the nucleation field (-Hn) is a positive value when the point b at which magnetic reversal occurs is in the range which the external magnetic field is a minus value, and in contrast, the nucleation field (-Hn) is a negative value when the point b is in the range which the external magnetic filed is a plus value.

The perpendicular magnetic film may be two or more layers having different compositions and structures, formed one upon the other.

For example, the perpendicular magnetic film may comprise a plurality of magnetic layers and intermediate layers provided in between each of the magnetic layers. The crystal structure of the intermediate layer may have a B2 structure or a hcp structure. The composition and structure of each of the magnetic layers may be identical to each other, or they may be different to each other. The material for the intermediate layers is not limited, however, in consideration of the consistency of the lattice, the use of Ru alloys in which Co, Cr, Fe, Ni, C, O, N, Si, B, or the like have been added to Ru is particularly preferable. The use of Ru is also preferable. The use of CoCr alloys to which Fe, Ni, Ru, Pt, Ta, C, O, N, Si, B, or the like have been added is particularly preferable.

The protection film 5 is for the prevention of corrosion of the perpendicular magnetic film 4, and for the prevention of the scratching of the surface of the medium when the magnetic head makes contact with the medium, and conventionally known materials can be used, for example, it is possible to use materials which contain C, $SiO_2$, and $ZrO_2$.

The thickness of the protection film 5 is preferably 1 to 10 nm.

In the lubricating film 6, it is preferable to use perfluoropolyether, fluorinated alcohol, fluorinated carboxylic acid, or the like.

In the manufacture of a magnetic recording medium have the above-described structure, a soft magnetic undercoat film 2, an orientation control film 3, and a perpendicular magnetic film 4 are successively formed on a substrate 1 using materials having the above-mentioned compositions by means of sputtering, vacuum deposition, ion plating, or the like. Next, a protection film 5 is formed preferably by means of a plasma CVD method, an ion beam method, or a sputtering method.

In order to form the lubricating film 6, a conventional publicly known method such as a dipping method, or a spin coat method can be used.

In the magnetic recording medium having the above-mentioned structure, the perpendicular magnetic film 4 has a structure in which many magnetic grains 7 are separated by grain boundary layer 8, and the average separating distance A between these magnetic grains 7 along straight lines which connect the centers of gravity of mutually neighboring magnetic grains 7 is 1 nm or greater. Therefore, the exchange interaction between the magnetic grains 7 themselves can be reduced, and noise characteristics can be improved.

In addition, the perpendicular magnetic film 4 comprises a CoCrPtX type alloy (X being at least one of Mo, B, V, W, Zr, Re, Cu, Ru, Hf, Ir, and Y), and a structure in which the amount of X contained is 0.5 to 15 at % is used. As a result, it is possible to promote the segregation of Cr in the grain boundary layer 8, and the Cr concentration ratio $c2/c1$ between the magnetic grains 7 and the grain boundary layer 8 can be increased.

Thereby, it is possible to increase the coercive force within the magnetic grains and to control the exchange coupling between magnetic grains 7.

Consequently, the reproduction output can be improved, noise reduction can be achieved, and superior noise characteristics can be obtained.

Figure 4:
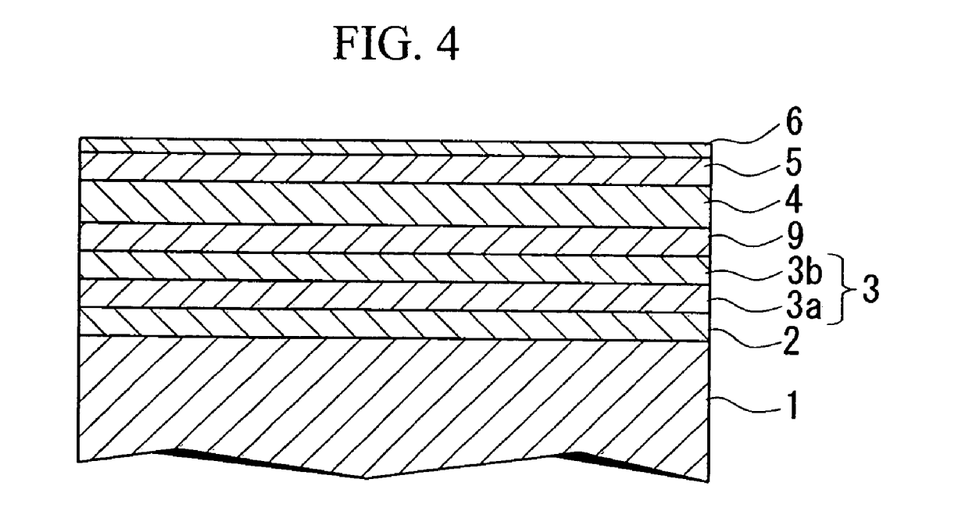
FIG. 4 is a partial cross-section showing a second embodiment of the magnetic recording medium of the present invention.

FIG. 4 shows a second embodiment of the magnetic recording medium of the present invention. The magnetic recording medium shown here comprises a non-magnetic intermediate film 9 between an orientation control film 3 and a perpendicular magnetic film 4.

It is preferable for a non-magnetic CoCr alloy, and particularly, a CoCrPtX1 alloy (X1 being at least one of Mo, Ta, B, V, W, Zr, Re, Cu, Ru, Hf, Ir, and Y) to be used in the non-magnetic intermediate film 9.

As the CoCrPtX1 type alloy, it is preferable to use an alloy in which the Cr content is 20 to 45 at %, the Pt content is 5 to 25 at %, the X1 content is 0.5 to 20 at %, and the remainder is Co.

It is preferable that the Cr content of the alloy is 30 to 45 at %.

It is preferable for the non-magnetic intermediate film 9 to comprise a CoCr type alloy, have a structure in which crystal grains having a high Cr content are separated by a grain boundary layer having a low Cr content, and to have structure in which the average separating distance between the crystal grains is 1 nm or greater.

When the average separating distance is less than the above-mentioned range, the separating distance between the magnetic grains 7 in the perpendicular magnetic film 4 becomes small, and the noise characteristics are degraded.

In the same way as for the separating distance of the magnetic grains 7 of the perpendicular magnetic film 4, this average separating distance can be calculated as the average value of the separating distance between crystal grains along a straight line connecting the centers of gravity of mutually neighboring crystal grains.

In addition, the average grain diameter of the crystal grains is preferably 4 to 12 nm.

When the average grain diameter is less than the above-mentioned range, the influence of the magnetic after-effect increases, and when it exceeds the above-mentioned range, the noise characteristics are degraded, therefore, this is not desirable.

In the same way as for the magnetic grains 7 of the perpendicular magnetic film 4, the average grain size can be obtained by calculating grain diameters of circles having surface areas identical to those of a plurality of crystal grains, and taking the average thereof.

In the calculation of the average grain size and the average separating distance between grains, the number of crystal grains which form the subject of the calculation is suitably 100 or greater (and preferably 500 or greater) from the point of view of the reliability of the data.

The thickness of the non-magnetic intermediate layer 9 is preferably 20 nm or less (and more preferably 10 nm or less) in order that there be no deterioration of the recording and reproducing properties due to the magnetic grains 7 in the perpendicular magnetic film 4 becoming coarse, and no degradation of the recording resolution due to the increase in distance between the magnetic head and the soft magnetic undercoat film 2.

In the magnetic recording medium of the present embodiment, by providing a non-magnetic intermediate film 9, it is possible to increase the perpendicular orientation of the perpendicular magnetic film 4, and therefore, it is possible to increase the coercive force Hc of the perpendicular magnetic film 4, and to further improve the recording and reproducing characteristics and the thermal stability.

Figure 5:
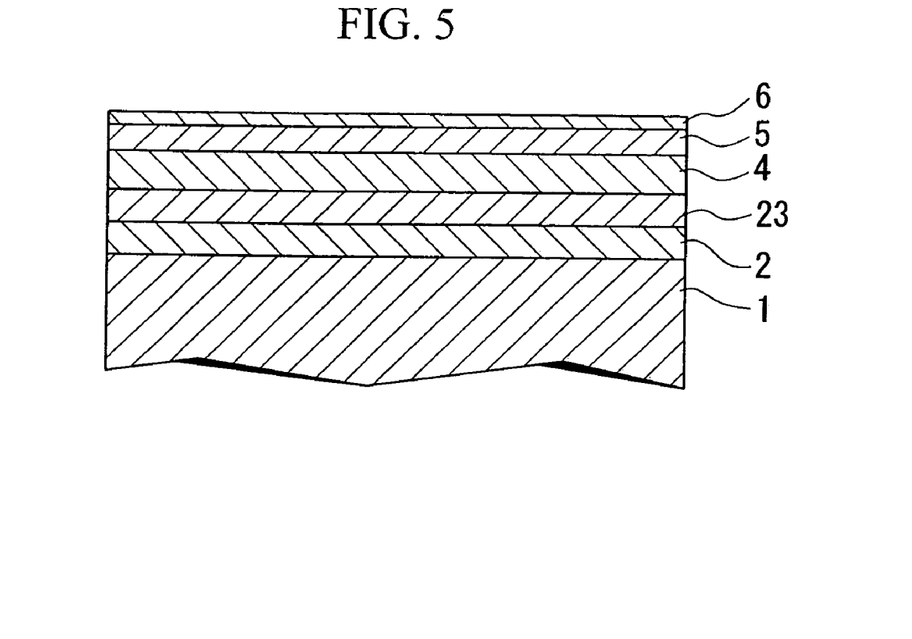
FIG. 5 is a partial cross-section showing a third embodiment of the magnetic recording medium of the present invention.

As shown in FIG. 5, the orientation control film is not limited to a two-layered structure, and it may be a single layer structure comprising a single material.

In this case, in the orientation control film 23, it is preferable to use a material which has one or two or more of Ti, Zn, Y, Zr, Ru, Re, Gd, Tb, and Hf as a main component. Of these, in particular, when Ru is used, it is possible to increase the perpendicular orientation of the perpendicular magnetic film 4, and therefore, this is preferable.

As this material, in light of the consistency of the lattice with respect to the perpendicular magnetic film, an alloy can be used in which Co, Cr, Fe, Ni, or the like have been added to these materials.

In addition, as this material, in order to reduce the crystal grains, an alloy can be used in which C, O, N, Si, or B has been added to these materials.

In the orientation control film 23, it is possible to use either of the structures of the above-mentioned first orientation control layer 3a or the second orientation control layer 3b.

The thickness of the orientation control film 23 is suitably 0.1 to 50 nm (preferably 1 to 25 nm, and more preferably 2 to 25 nm).

When the thickness is less than the above-mentioned range, the perpendicular orientation within the perpendicular magnetic film 4 is degraded, and the recording and reproducing characteristics and thermal stability becomes inferior. In addition, when the thickness exceeds the above-mentioned range, the crystal grains become coarse, the crystal grains in the perpendicular magnetic film 4 become coarse, and the recording and reproducing characteristic are degraded. In addition, because the distance between the magnetic head and the soft magnetic undercoat film 2 during recording and reproduction is increased, the resolution of the reproduction signal is degraded, and therefore, this is not desirable.

Figure 6:
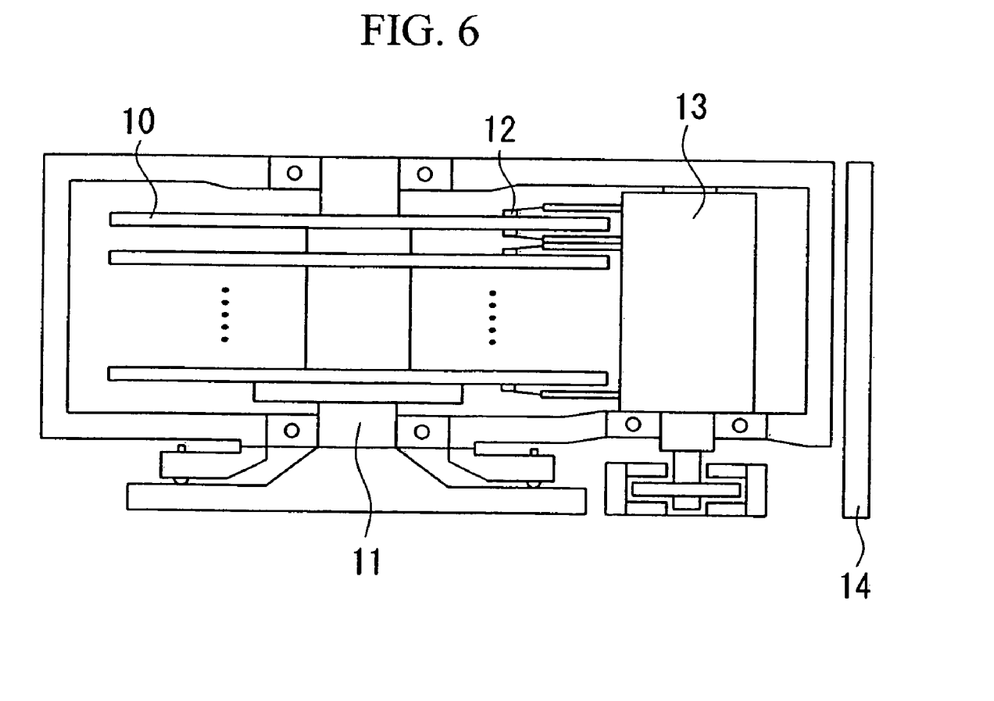
FIG. 6 is a schematic diagram showing an example of the magnetic recording and reproducing apparatus of the present invention.

FIG. 6 shows an example of a magnetic recording and reproducing apparatus which uses the above-mentioned magnetic recording medium. The magnetic recording and reproducing apparatus shown here comprises a magnetic recording medium 10, a medium drive section 11 for rotating and driving the magnetic recording medium 10, a magnetic head 12 for recording and reproducing information on the magnetic recording medium 10, a head drive section 13, and a recording and reproducing signal processing system 14. The recording and reproducing signal processing system 14 is able to process input data and send a recording signal to the magnetic head 12, and to process a reproduction signal from the magnetic head 12 and output the data.

As the magnetic head 12, it is possible to use a composite thin-film magnetic head comprising an MR element and a GMR element, and it is also possible to use a single magnetic pole head for perpendicular recording.

According to the above-mentioned magnetic recording and reproducing apparatus, since the above-mentioned magnetic recording medium 10 is used, the noise characteristic can be improved, and high density recording is possible.

In addition, in the present invention, main component indicates that the concerned component is contained at greater than 50 at %.

EXAMPLES

In the following, Examples are shown, and the actions and effects of the present invention are made clear.

Test Example 1

A washed glass substrate 1 (external diameter of 65 mm, and thickness of 0.635 mm; manufactured by Ohara Co.) was set within the chamber of a DC magnetron sputtering device (C-3010, manufactured by Anelva Co.), and the chamber evacuated to a vacuum of $1 \times 10^{-5}$ Pa was reached. Thereafter, a soft magnetic undercoat film 2 (having a thickness of 250 nm) comprising 89Co4Zr7Nb was formed on this glass substrate 1 by means of sputtering using a target comprising 89 at % Co, 4 at % Zr, and 7 at % Nb (89Co4Zr7Nb) under conditions of 100° C. or less.

Next, under conditions of 210° C., an orientation control film 3 comprising a first orientation control layer (thickness 20 nm) comprising 50 at % Ni and 50 at % Al, and a second orientation control layer (thickness 20 nm) comprising 60 at % Ru, and 40 at % Co was formed on the soft magnetic undercoat film 2.

Next, a perpendicular magnetic film 4 (thickness 20 nm) comprising 65 at % Co, 20 at % Cr, and 15 at % Pt was formed.

Next, a protection film 5 comprising DLC (diamond like carbon) having a thickness of 6 nm was formed by a CVD method.

Next, a lubricating film 6 (thickness 2 nm) comprising perfluoropolyether was formed by means of a dip coating method, and thereby a magnetic recording medium was obtained.

Test Examples 2 and 3

Magnetic recording media were obtained in the same way as for Test Example 1 with the exception that the perpendicular magnetic film 4 comprised 73Co12Cr15Pt, and 58Co24Cr18Pt respectively.

Test Examples 4 to 13

Magnetic recording media were obtained in the same way as for Test Example 1 with the exception that CoCrPtX ((65-x) at % Co, 20 at % Cr, 15 at % Pt, and x at % X) was used in the perpendicular magnetic film 4.

With regard to the magnetic recording media of the above-mentioned Test Examples 1 to 13, the results of observation of the perpendicular magnetic film 4 with regard to the surface parallel to the substrate 1 using TEM were that the perpendicular magnetic film 4 had a structure having a large number of magnetic grains 7 and a grain boundary layer 8 which separated them. The results of the calculation of the average grain diameter of the magnetic grains 7 (magnetic grain diameter) and the average separating distance between the magnetic grains 7 (thickness of the grain boundary layer 8) are shown in Table 1.

In addition, the ratios c2/c1 of the Cr concentration c2 of the grain boundary layer 8 and the Cr concentration c1 of the magnetic grains measured using a field emission type perspective electron microscope are shown in Table 1.

In addition, the magnetic characteristic of coercive force Hc and nucleation field (−Hn) were measured using a vibrating sample magnetometer (VSM).

In addition, the recording and reproducing characteristics (electrical performance) of these magnetic recording media were measured using a read-write analyzer, RWA 1632, and a spin-stand, S 1701 MP, manufactured by Guzik Co.

In order to evaluate the recording and reproducing characteristics, measurement was carried out using a composite thin-film magnetic head having a giant magnetoresistance (GMR) element in the reproducing section, and a track recording density of 600 kFCI.

In addition, the LFTAA shows the output when reproducing at 50 kFCI is carried out, SNR shows the ratio of the noise which occurs when recording at 600 kFCI and the reproducing output at 50 kFCI.

In addition, in the evaluation of thermal stability, after heating the substrate to 70° C. and writing at a track recording density of 50 kFCI, the reduction in output (%/decade) with respect to the reproduction output one second after writing is calculated based on $(S_o-S) \times 100/(S_o \times 3)$. In this formula, $S_o$ represents the reproduction output one second after a signal is recorded on the magnetic recording medium, and S represents the reproducing output 1000 seconds after a signal is recorded. The result is shown in Table 1 as thermal decay.

Test Examples 14 to 29

Magnetic recording media were obtained in the same way as in Test Example 1 with the exception that the materials shown in Tables 2 to 4 were used in perpendicular magnetic film 4.

In the same way as for Test Examples 1 to 13, the magnetic grain diameter, the separating distance between grains, the magnetic characteristics, recording and reproducing characteristics, and the thermal stability were evaluated and the results are shown in Tables 2 to 4.

Test Examples 30 to 52

Magnetic recording media were prepared by forming a non-magnetic intermediate film 9 in between the orientation control film 3 and the perpendicular magnetic film 4.

In the same way as for Test Examples 1 to 13, the magnetic grain diameter, the separating distance between grains, the magnetic characteristics, recording and reproducing characteristics, and the thermal stability were evaluated and the results are shown in Table 5.

Test Examples 53 to 69

A washed glass substrate 1 (external diameter of 65 mm, and thickness of 0.635 mm; manufactured by Ohara Co.) was set within the chamber of a DC magnetron sputtering device (C-3010, manufactured by Anelva Co.), and the chamber evacuated to a vacuum of $1 \times 10^{-5}$ Pa was reached. Thereafter, a soft magnetic undercoat film 2 (thickness of 250 nm) comprising 89Co4Zr7Nb was formed on this glass substrate 1 by means of sputtering using a target comprising 89 at % Co, 4 at % Zr, and 7 at % Nb (89Co4Zr7Nb) under conditions of 100° C. or less.

Next, under conditions of 100° C. or less, an orientation control film 3 comprising a first orientation control layer (thickness 20 nm) comprising 50 at % Ni and 50 at % Al, and a second orientation control layer (thickness 20 nm) comprising 60 at % Ru, and 40 at % Co was formed on the soft magnetic undercoat film 2.

Next, a perpendicular magnetic film 4 (thickness 15 nm) comprising $SiO_2$, $Si_3N_4$, $Al_2O_3$, TiO, $TiO_2$, TiN, or TiC as shown in Table 6 was formed.

Next, a protection film 5 comprising DLC (diamond like carbon) having a thickness of 6 nm was formed by a CVD method.

Next, a lubricating film 6 (thickness 2 nm) comprising perfluoropolyether was formed by means of a dip coating method, and thereby a magnetic recording medium was obtained.

The film forming pressure in each of Test Examples 1, 2 and 53–69 is as shown below.

Test Examples 53 to 59 and 64 to 69: 4.0 Pa.
Test Examples 60 and 61: 1.3 Pa.
Test Examples 62 and 63: 2.7 Pa.
Test Examples 1 and 2: 0.6 Pa.

In the same way as for Test Examples 1 to 13, the magnetic grain diameter, the separating distance between grains, the magnetic characteristics, recording and reproducing characteristics, and the thermal stability were evaluated and the results shown in Table 6.

TABLE 1

| Test Examples | Perpendicular magnetic film Co [at %] | Cr [at %] | Pt [at %] | X element [at %] | Magnetic grain diameter (nm) | Average Separating Distance (nm) | Grain boundary layer Cr Concentration (at %) | Cr Concentration ratio c2/c1 | Magnetostatic Characteristics Hc (Oe) | -Hn (Oe) | Electrical Performance LFTAA (mV) | SNR (dB) | Thermal decay (% decade) |
|---|---|---|---|---|---|---|---|---|---|---|---|---|---|
| 1 | 65 | 20 | 15 | — | 15 | 0.5 | 22 | 1.25 | 3522 | 300 | 2.459 | 18.3 | 1.04 |
| 2 | 73 | 12 | 15 | — | 26 | 0.3 | 13 | 1.15 | 3187 | 0 | 2.294 | 14.8 | 2.33 |
| 3 | 58 | 24 | 18 | — | 20 | 0.7 | 32 | 1.30 | 3439 | −2100 | 2.086 | 20.1 | 3.06 |
| 4 | 60 | 20 | 15 | Mo 5 | 8 | 2.1 | 24 | 1.55 | 3891 | 950 | 2.651 | 23.2 | 0.83 |
| 5 | 57 | 20 | 15 | V 8 | 9 | 2.2 | 23 | 1.61 | 4435 | 1300 | 2.720 | 23.5 | 0.65 |
| 6 | 61 | 20 | 15 | Cu 4 | 8 | 2.5 | 25 | 1.64 | 5278 | 1500 | 2.784 | 23.9 | 0.44 |
| 7 | 55 | 20 | 15 | W 10 | 7 | 2.5 | 26 | 1.63 | 5061 | 1450 | 2.783 | 24.1 | 0.50 |
| 8 | 58 | 20 | 15 | Re 7 | 9 | 2.2 | 24 | 1.59 | 5137 | 900 | 2.647 | 24.7 | 0.59 |
| 9 | 62 | 20 | 15 | Zr 3 | 7 | 2.7 | 22 | 1.53 | 4983 | 500 | 2.539 | 25.5 | 0.70 |
| 10 | 59 | 20 | 15 | B 6 | 6 | 2.7 | 25 | 1.54 | 5391 | 650 | 2.600 | 25.3 | 0.59 |
| 11 | 61 | 20 | 15 | Ta 4 | 9 | 1.9 | 22 | 1.48 | 4037 | 450 | 2.521 | 22.7 | 0.90 |
| 12 | 53 | 20 | 15 | Ru 12 | 8 | 2.4 | 24 | 1.56 | 5062 | 1200 | 2.703 | 25.1 | 0.55 |
| 13 | 59 | 20 | 15 | Hf 6 | 6 | 3 | 28 | 1.73 | 4130 | 800 | 2.687 | 26.0 | 0.81 |

TABLE 2

| Test Examples | Perpendicular magnetic film Co [at %] | Cr [at %] | Pt [at %] | Cu [at %] | Magnetic grain diameter (nm) | Average Separating Distance (nm) | Grain boundary layer Cr Concentration (at %) | Cr Concentration ratio c2/c1 | Magnetostatic Characteristics Hc (Oe) | -Hn (Oe) | Electrical Performance LFTAA (mV) | SNR (dB) | Thermal decay (% decade) |
|---|---|---|---|---|---|---|---|---|---|---|---|---|---|
| 14 | 70 | 18 | 12 | — | 15 | 0.5 | 20 | 1.20 | 3246 | −400 | 2.291 | 20.9 | 2.46 |
| 15 | 69 | 18 | 12 | 1 | 11 | 1.5 | 23 | 1.45 | 4075 | 100 | 2.457 | 23.2 | 0.97 |
| 16 | 67 | 18 | 12 | 3 | 9 | 1.7 | 24 | 1.54 | 4582 | 950 | 2.650 | 24.0 | 0.69 |
| 17 | 64 | 18 | 12 | 6 | 8 | 2.2 | 26 | 1.58 | 5031 | 1400 | 2.766 | 24.9 | 0.51 |
| 18 | 60 | 18 | 12 | 10 | 7 | 2.3 | 27 | 1.63 | 5161 | 1650 | 2.833 | 25.5 | 0.44 |

TABLE 2-continued

| | Perpendicular magnetic film | | | | Magnetic grain diameter (nm) | Average Separating Distance (nm) | Grain boundary layer | | Magnetostatic Characteristics | | Electrical Performance | | Thermal decay (% decade) |
|---|---|---|---|---|---|---|---|---|---|---|---|---|---|
| Test Examples | Co [at %] | Cr [at %] | Pt [at %] | Cu [at %] | | | Cr Concentration (at %) | Cr Concentration ratio c2/c1 | Hc (Oe) | -Hn (Oe) | LFTAA (mV) | SNR (dB) | |
| 19 | 56 | 18 | 12 | 14 | 9 | 2.1 | 25 | 1.55 | 4396 | 1300 | 2.731 | 24.2 | 0.66 |
| 20 | 53 | 18 | 12 | 17 | 13 | 1.9 | 22 | 1.35 | 3533 | 100 | 2.433 | 22.2 | 1.07 |
| 21 | 50 | 18 | 12 | 20 | 14 | 1.6 | 20 | 1.30 | 3571 | −200 | 2.346 | 21.5 | 1.13 |

TABLE 3

| | Perpendicular magnetic film | | | | Magnetic grain diameter (nm) | Average Separating Distance (nm) | Grain boundary layer | | Magnetostatic Characteristics | | Electrical Performance | | Thermal decay (% decade) |
|---|---|---|---|---|---|---|---|---|---|---|---|---|---|
| Test Examples | Co [at %] | Cr [at %] | Pt [at %] | Cu [at %] | | | Cr Concentration (at %) | Cr Concentration ratio c2/c1 | Hc (Oe) | -Hn (Oe) | LFTAA (mV) | SNR (dB) | |
| 22 | 68 | 18 | 8 | 6 | 8 | 2.2 | 25 | 1.57 | 3876 | −250 | 2.424 | 24.9 | 2.15 |
| 17 | 64 | 18 | 12 | 6 | 8 | 2.2 | 26 | 1.58 | 5031 | 1400 | 2.766 | 24.9 | 0.51 |
| 23 | 56 | 18 | 20 | 6 | 9 | 2 | 25 | 1.54 | 6246 | 2000 | 2.870 | 24.5 | 0.15 |
| 24 | 53 | 18 | 23 | 6 | 20 | 1.7 | 22 | 1.20 | 4076 | 1900 | 2.371 | 19.4 | 1.21 |

TABLE 4

| | Perpendicular magnetic film | | | | Magnetic grain diameter (nm) | Average Separating Distance (nm) | Grain boundary layer | | Magnetostatic Characteristics | | Electrical Performance | | Thermal decay (% decade) |
|---|---|---|---|---|---|---|---|---|---|---|---|---|---|
| Test Examples | Co [at %] | Cr [at %] | Pt [at %] | Cu [at %] | | | Cr Concentration (at %) | Cr Concentration ratio c2/c1 | Hc (Oe) | -Hn (Oe) | LFTAA (mV) | SNR (dB) | |
| 25 | 72 | 10 | 12 | 6 | 16 | 0.6 | 14 | 1.15 | 2986 | −100 | 2.284 | 19.0 | 1.22 |
| 26 | 68 | 14 | 12 | 6 | 11 | 1.8 | 19 | 1.50 | 4311 | 850 | 2.574 | 22.1 | 0.77 |
| 17 | 64 | 18 | 12 | 6 | 8 | 2.2 | 26 | 1.58 | 5031 | 1400 | 2.766 | 24.9 | 0.51 |
| 27 | 56 | 26 | 12 | 6 | 5 | 2.5 | 32 | 1.60 | 4027 | 600 | 2.669 | 27.8 | 0.87 |
| 28 | 52 | 30 | 12 | 6 | 14 | 1.4 | 30 | 1.30 | 3132 | −800 | 1.789 | 23.9 | 2.67 |
| 29 | 48 | 30 | 12 | 10 | 12 | 1.3 | 32 | 1.20 | 3044 | −1000 | 1.763 | 25.0 | 2.78 |

TABLE 5

| | Non-magnetic intermediate film | | | | Perpendicular magnetic film composition | Magnetic grain diameter (nm) | Average Separating Distance (nm) | Grain boundary layer, Cr Concentration ratio c2/c1 | Magnostatic characteristics | | Thermal decay (% decade) |
|---|---|---|---|---|---|---|---|---|---|---|---|
| Test Examples | Co [at %] | Cr [at %] | Pt [at %] | X element [at %] | | | | | Hc (Oe) | -Hn (Oe) | |
| 2 | none | — | — | — | Co12Cr15Pt | 26 | 0.3 | 1.15 | 3187 | 0 | 2.33 |
| 30 | 57 | 35 | 8 | — | Co12Cr15Pt | 16 | 0.8 | 1.3 | 3532 | 200 | 1.58 |
| 31 | 51 | 35 | 8 | Mo 6 | Co12Cr15Pt | 9 | 1.7 | 1.45 | 3989 | 1050 | 0.71 |
| 32 | 51 | 36 | 8 | V 5 | Co12Cr15Pt | 10 | 1.5 | 1.42 | 3876 | 950 | 0.75 |
| 33 | none | — | — | — | Co18Cr15Pt6Cu | 10 | 2.1 | 1.58 | 5258 | 1400 | 0.42 |
| 34 | 57 | 35 | 8 | — | Co18Cr15Pt6Cu | 7 | 2.3 | 1.64 | 5358 | 1550 | 0.38 |
| 35 | 51 | 34 | 8 | Cu 7 | Co18Cr15Pt6Cu | 6 | 2.5 | 1.7 | 5498 | 1600 | 0.34 |
| 36 | 51 | 34 | 8 | Cu 7 | Co12Cr15Pt | 10 | 1.9 | 1.51 | 3847 | 1000 | 0.75 |
| 37 | 51 | 34 | 8 | Cu 7 | Co18Cr15Pt | 9 | 2.2 | 1.55 | 4349 | 850 | 0.68 |
| 38 | 51 | 34 | 8 | Cu 7 | Co26Cr15Pt | 8 | 2.5 | 1.57 | 4698 | 500 | 0.68 |
| 39 | 52 | 35 | 8 | W 5 | Co12Cr15Pt | 10 | 1.4 | 1.42 | 4058 | 800 | 0.75 |
| 40 | 48 | 37 | 6 | Re 9 | Co12Cr15Pt | 7 | 2.1 | 1.53 | 3709 | 750 | 0.82 |
| 41 | 53 | 36 | 7 | Zr 4 | Co12Cr15Pt | 8 | 1.8 | 1.49 | 3984 | 900 | 0.74 |
| 42 | 60 | 29 | 7 | Zr 4 | Co12Cr15Pt | 15 | 1.2 | 1.26 | 3649 | 300 | 0.91 |
| 43 | 48 | 43 | 5 | Zr 4 | Co12Cr15Pt | 4 | 2 | 1.6 | 4248 | 600 | 0.75 |
| 44 | 44 | 47 | 5 | Zr 4 | Co12Cr15Pt | 16 | 0.7 | 1.24 | 3259 | −300 | 2.42 |
| 45 | 51 | 35 | 8 | Ta 6 | Co12Cr15Pt | 10 | 1.4 | 1.43 | 3948 | 950 | 0.74 |
| 46 | 53 | 35 | 8 | Ru 4 | Co12Cr15Pt | 10 | 1.4 | 1.44 | 4148 | 1050 | 0.68 |
| 47 | 53 | 37 | 3 | B 7 | Co12Cr15Pt | 8 | 1.8 | 1.5 | 3349 | −100 | 2.30 |
| 48 | 51 | 37 | 5 | B 7 | Co12Cr15Pt | 8 | 1.8 | 1.5 | 3846 | 600 | 0.82 |
| 49 | 48 | 37 | 8 | B 7 | Co12Cr15Pt | 8 | 1.8 | 1.5 | 3874 | 700 | 0.80 |
| 50 | 42 | 37 | 14 | B 7 | Co12Cr15Pt | 8 | 1.8 | 1.5 | 3843 | 650 | 0.81 |
| 51 | 38 | 37 | 18 | B 7 | Co12Cr15Pt | 8 | 1.8 | 1.5 | 3416 | 100 | 1.65 |
| 52 | 50 | 37 | 8 | Hf 5 | Co12Cr15Pt | 7 | 2.3 | 1.65 | 4149 | 900 | 0.71 |

TABLE 6

| Test Examples | Perpendicular magnetic film | | | | Magnetic Grain Diameter (nm) | Average Separating Distance (nm) | Grain boundary layer | | Magnetostatic Characteristics | | Electrical Performance | | Thermal decay (% decade) |
|---|---|---|---|---|---|---|---|---|---|---|---|---|---|
| | Co [at %] | Cr [at %] | Pt [at %] | X element [at %] | | | X Concentration (at %) | X Concentration Ratio c2/c1 | Hc (Oe) | -Hn (Oe) | LFTAA (mV) | SNR (dB) | |
| 1 | 65 | 20 | 15 | — | 15 | 0.5 | 22 (Cr) | 1.25 (Cr) | 3522 | 300 | 2.459 | 18.3 | 1.04 |
| 2 | 73 | 12 | 15 | — | 26 | 0.3 | 13 (Cr) | 1.15 (Cr) | 3187 | 0 | 2.294 | 14.8 | 2.33 |
| 53 | 65 | 12 | 15 | 8 ($SiO_2$) | 7 | 3.5 | 29 | 3.21 | 4600 | 1600 | 2.865 | 26.2 | 0.34 |
| 54 | 65 | 12 | 15 | 8 (TiO) | 7 | 2.8 | 27 | 2.87 | 4500 | 1400 | 2.768 | 25.8 | 0.39 |
| 55 | 65 | 12 | 15 | 8 ($TiO_2$) | 7 | 2.9 | 29 | 3.14 | 4500 | 1500 | 2.798 | 26.1 | 0.33 |
| 56 | 65 | 12 | 15 | 8 ($Al_2O_3$) | 8 | 2.6 | 26 | 2.31 | 4300 | 1200 | 2.739 | 25.5 | 0.41 |
| 57 | 65 | 12 | 15 | 8 ($Si_3N_4$) | 8 | 2.5 | 25 | 2.22 | 4200 | 1200 | 2.738 | 25.2 | 0.41 |
| 58 | 65 | 12 | 15 | 8 (TiN) | 7 | 2.9 | 28 | 2.98 | 4500 | 1350 | 2.795 | 25.7 | 0.35 |
| 59 | 65 | 12 | 15 | 8 (TiC) | 7 | 2.9 | 27 | 3.01 | 4450 | 1450 | 2.812 | 25.6 | 0.34 |
| 60 | 65 | 12 | 15 | 8 ($SiO_2$) | 8 | 1.8 | 22 | 1.45 | 3850 | 900 | 2.712 | 23.1 | 0.55 |
| 61 | 65 | 12 | 15 | 8 ($TiO_2$) | 8 | 1.9 | 21 | 1.55 | 4100 | 1100 | 2.756 | 23.5 | 0.41 |
| 62 | 65 | 12 | 15 | 8 ($SiO_2$) | 7 | 2.5 | 25 | 1.88 | 4300 | 1300 | 2.796 | 25.4 | 0.35 |
| 63 | 65 | 12 | 15 | 8 ($TiO_2$) | 7 | 2.2 | 24 | 1.90 | 4450 | 1350 | 2.775 | 25.4 | 0.33 |
| 64 | 69 | 12 | 15 | 4 ($SiO_2$) | 9 | 1.6 | 18 | 3.01 | 3600 | 1000 | 2.885 | 22.1 | 0.22 |
| 65 | 63 | 12 | 15 | 10 ($SiO_2$) | 7 | 3.6 | 30 | 2.90 | 4350 | 1200 | 2.769 | 26.0 | 0.41 |
| 66 | 77 | — | 15 | 8 ($SiO_2$) | 8 | 3.3 | 28 | 3.41 | 4700 | 1700 | 2.833 | 26.0 | 0.31 |
| 67 | 77 | — | 15 | 8 (TiO) | 7 | 3.2 | 28 | 2.97 | 4600 | 1600 | 2.745 | 25.8 | 0.26 |
| 68 | 77 | — | 15 | 8 ($TiO_2$) | 7 | 3.0 | 28 | 3.22 | 4600 | 1600 | 2.845 | 26.0 | 0.27 |
| 69 | 77 | — | 15 | 8 ($Al_2O_3$) | 8 | 2.8 | 27 | 2.67 | 4450 | 1400 | 2.800 | 25.7 | 0.31 |

From Tables 1 to 5, it can be understood that in a magnetic recording medium in which a CoCrPtX type alloy (X being at least one of Mo, B, V, W, Zr, Re, Cu, Ru, Hf, Ir, and Y) is used in the perpendicular magnetic film 4, the separating distance between magnetic grains 7 is large, the Cr concentration ratio c2/c1 is 1.4 or greater, the nucleation field (−Hn) is large, and the thermal decay is greatly improved.

In addition, even when a non-magnetic intermediate film 9 comprising CoCrPtX1 type alloy (X1 being at least one of Mo, Ta, B, V, W, Zr, Re, Cu, Ru, Hf, Ir, and Y; and the content of Cr is 20 at % or greater) is formed between an orientation control film 3 and a perpendicular magnetic film 4, the same effects can be obtained.

As has been explained above, in the magnetic recording medium of the present invention, the perpendicular magnetic film has a structure in which a large number of magnetic grains are separated by a grain boundary layer, and the average separating distance between these magnetic grains along straight lines which connect the centers of gravity of mutually neighboring magnetic grains is 1 nm or greater. Therefore, the exchange interaction between the magnetic grains themselves can be reduced, and the noise characteristics can be improved.

In addition, the perpendicular magnetic film comprises a CoCrPtX type alloy (X being at least one of Mo, B, V, W, Zr, Re, Cu, Ru, Hf, Ir, and Y), and a structure in which the amount of X contained is 0.5 to 15 at % is used. As a result, it is possible to promote the segregation of Cr in the grain boundary layer, and the Cr concentration ratio between the magnetic grains and the grain boundary layer can be increased.

Thereby, it is possible to increase the coercive force within the magnetic grains and to control the exchange coupling between magnetic grains.

Consequently, the reproduction output can be improved, noise reduction can be achieved, and superior noise characteristics can be obtained.

From Table 6, it can be seen that a CoPtX type alloy (where X is an oxide and a nitride, and 2>c2/c1≧1.4) is preferable; a CoCrPtX type alloy (where X is an oxide and a nitride, and 2>c2/c1≧1.4) is more preferable; and a CoCrPtX type alloy (where X is an oxide and a nitride, and c2/c1≧2) is most preferable. This is clear in comparison with the results from Test Examples 1 and 2.

What is claimed is:

1. A magnetic recording medium comprising:
   a non-magnetic substrate;
   at least a soft magnetic undercoat film comprising a soft magnetic material and formed on the non-magnetic substrate;
   an orientation control film formed on the soft magnetic undercoat film for controlling an orientation of a film directly above the orientation control film;
   a perpendicular magnetic film which is formed on the orientation control film and has an axis of easy magnetization oriented mainly perpendicularly with respect to the substrate; and
   a protection film formed on the perpendicular magnetic film,
   wherein the perpendicular magnetic film has a structure in which magnetic grains are separated by a grain boundary layer, and an average separating distance between the magnetic grains along a straight line which connects centers of gravity of mutually neighboring magnetic grains is 1 nm or greater, and
   wherein the perpendicular magnetic film comprises a CoPtX alloy (X being at least one of $SiO_2$, SiO, $Si_3N_4$, $Al_2O_3$, AlN, TiO, $TiO_2$, TiN, BN, $CaF_2$, and TiC), and when an X concentration in the magnetic grains is c1, and an X concentration in the grain boundary layer is c2, c2/c1 is 1.4 or greater.

2. A magnetic recording medium comprising:
   a non-magnetic substrate;
   at least a soft magnetic undercoat film comprising a soft magnetic material and formed on the non-magnetic substrate;
   an orientation control film formed on the soft magnetic undercoat film for controlling an orientation of a film directly above the orientation control film;

a perpendicular magnetic film which is formed on the orientation control film and has an axis of easy magnetization oriented mainly perpendicularly with respect to the substrate; and a protection film formed on the perpendicular magnetic film, wherein the perpendicular magnetic film has a structure in which magnetic grains are separated by a grain boundary layer, and an average separating distance between the magnetic grains along a straight line which connects centers of gravity of mutually neighboring magnetic grains is 1 nm or greater, and wherein the perpendicular magnetic film comprises a CoCrPtX alloy (X being at least one of $SiO_2$, SiO, $Si_3N_4$, $Al_2O_3$, AlN, TiO, $TiO_2$, TiN, BN, $CaF_2$, and TiC), and when an X concentration in the magnetic grains is $c1$, and an X concentration in the grain boundary layer is $c2$, $c2/c1$ is 1.4 or greater.

3. A magnetic recording medium according to claim 1, wherein an average grain diameter of the crystal grains is 4 to 12 nm.

4. A magnetic recording medium according to claim 2, wherein an average grain diameter of the crystal grains is 4 to 12 nm.

* * * * *